United States Patent
Winter et al.

[11] Patent Number: 6,063,147
[45] Date of Patent: May 16, 2000

[54] GASIFICATION OF BIOSLUDGE

[75] Inventors: John D. Winter, Independence, Kans.; George N. Richter, San Marino, Calif.

[73] Assignee: Texaco Inc., White Plains, N.Y.

[21] Appl. No.: 09/213,683

[22] Filed: Dec. 17, 1998

[51] Int. Cl.[7] .................................. C10L 5/46; C10L 5/48
[52] U.S. Cl. .................................. 44/597; 44/598; 44/593
[58] Field of Search ........................................ 44/597, 598

[56] References Cited

U.S. PATENT DOCUMENTS

| | | | |
|---|---|---|---|
| 4,396,513 | 8/1983 | Haldeman | 210/734 |
| 4,668,388 | 5/1987 | Dibble et al. | 210/150 |
| 4,702,745 | 10/1987 | Kamei et al. | 44/10 D |
| 5,250,080 | 10/1993 | Michelena et al. | 44/575 |
| 5,431,702 | 7/1995 | Schulz | 44/552 |
| 5,858,222 | 1/1999 | Shibata et al. | 210/177 |

*Primary Examiner*—Ellen M. McAvoy
*Attorney, Agent, or Firm*—Harold J. Delhommer; Rodman & Rodman

[57] ABSTRACT

The high intracellular water content contained within the cell walls of the bacterial cells of a dewatered biosludge is reduced by removing the intracellular water in a denaturing operation. This operation comprises heating the biosludge at a temperature sufficient to weaken the bacterial cell walls. The weakened cell walls are then exposed to a reduced pressure sufficient to form vapor within the cell and to thus rupture the weakened cell walls and thereby release the intracellular water in the form of a hot aqueous vapor and/or released intracellular water. The water-reduced concentrated biosludge can then serve as a fuel source in a partial oxidation reaction for the production of synthesis gas.

12 Claims, 1 Drawing Sheet

GASIFICATION OF BIOSLUDGE

BACKGROUND OF THE INVENTION

Wastewater treatment facilities separate the wastewater components into coarse solids, scum grit and sludge. Sewage sludge is a mixture of suspended, colloidal and dissolved organic and inorganic matter which is separated from wastewater during treatment.

Wastewater is generally subjected to a primary treatment wherein the suspended solid content is removed by physical means such as screening and gravity sedimentation. Chemical precipitation is useful in removing lightweight suspended and colloidal solids.

The remaining liquid sewage is then subjected to a secondary treatment wherein microorganisms, primarily bacteria, are used to stabilize and denature waste components by degrading complex organics and/or killing pathogens. The mixture of microorganisms is usually referred to as "biomass." During the biological treatment of wastewater or sewage, the waste components function as nutrients for the microorganisms, enabling them to reproduce and multiply as they stabilize and denature the waste components.

Thus, the quantity of biomass in a waste treatment system increases during the stabilization and denaturing treatment. In order to avoid the buildup of an excessive amount of microorganisms which can "choke" the process, a portion of the microorganisms must be removed or "wasted" from the treatment system. The wasted microorganisms are referred to as "biosludge." A major cost component of all biologically based processes is the need to dispose of this biosludge in an environmentally acceptable fashion.

The general treatment or management of sludge involves stabilization of biodegradable organics, concentration and dewatering, and ultimate disposal of the stabilized, dewatered residue.

Generated sludges are often dilute, on the order of about. 1–2 percent solids by weight. In order to reduce the volumetric loading on other processes, the first step in sludge processing is often concentration, by such means as gravity thickening and flotation.

Organic sludges from primary treatment can usually be concentrated to about 5–8 weight percent solids. Sludges from secondary treatment can usually be gravity thickened to about 2 to 4 weight percent solids.

Dewatering is different from concentration in that concentration still leaves the sludge with the properties of a liquid. Dewatering uses mechanical operations such as centrifugation, vacuum and/or pressure filtration and sand beds to produce a product which is essentially a friable solid. When the water content of sludge is reduced by dewatering to about 65–80 percent, it forms a porous solid called sludge cake. There is no free water in the cake as the water is chemically combined with the solids or tightly adsorbed on the internal pores or held within the cells of microorganisms.

Biosludge is the organic biomass remaining after biological waste water treatment. Biosludge usually has to be mechanically dewatered to reduce water content below approximately 96 weight %. A significant source of water in the biosludge is contained within the cells of biota present in the sludge, and is referred to as "intracellular water." by dewatered biosludge filter cake with no free liquid can still have a water content in excess of 80% by weight due principally to the amount of intracellular water contained in the cells of the dewatered biosludge.

"Dry solids" is the water-free residue left after a dewatered sample is dried in nitrogen at 105° C. until no further weight loss is observed. The term "free liquid" is liquid that is not physically adsorbed or encumbered or chemically combined, and can be released through conventional filtration processes.

Currently available technologies for reducing the water content of the biosludge and utilizing the biosludge are costly and require excessive amounts of energy. In particular, they have all been round to be uneconomical and impractical means for converting biosludge and sewage sludge into a viable feed for a partial oxidation gasification reaction.

SUMMARY OF THE INVENTION

The high intracellular water content contained within the cell walls of the bacterial cells of a dewatered biosludge is reduced by removing the intracellular water in a denaturing operation. This operation comprises heating the biosludge at a temperature sufficient to weaken the bacterial cell walls. The weakened cell walls are then exposed to a reduced pressure sufficient to form vapor within the cell and to thus rupture the weakened cell walls and thereby release the intracellular water as free water or in the form of a hot aqueous vapor. The water-reduced concentrated biosludge can then serve as a fuel source in a partial oxidation reaction for the production of synthesis gas.

DESCRIPTION OF THE PREFERRED EMBODIMENTS

Figure 1:
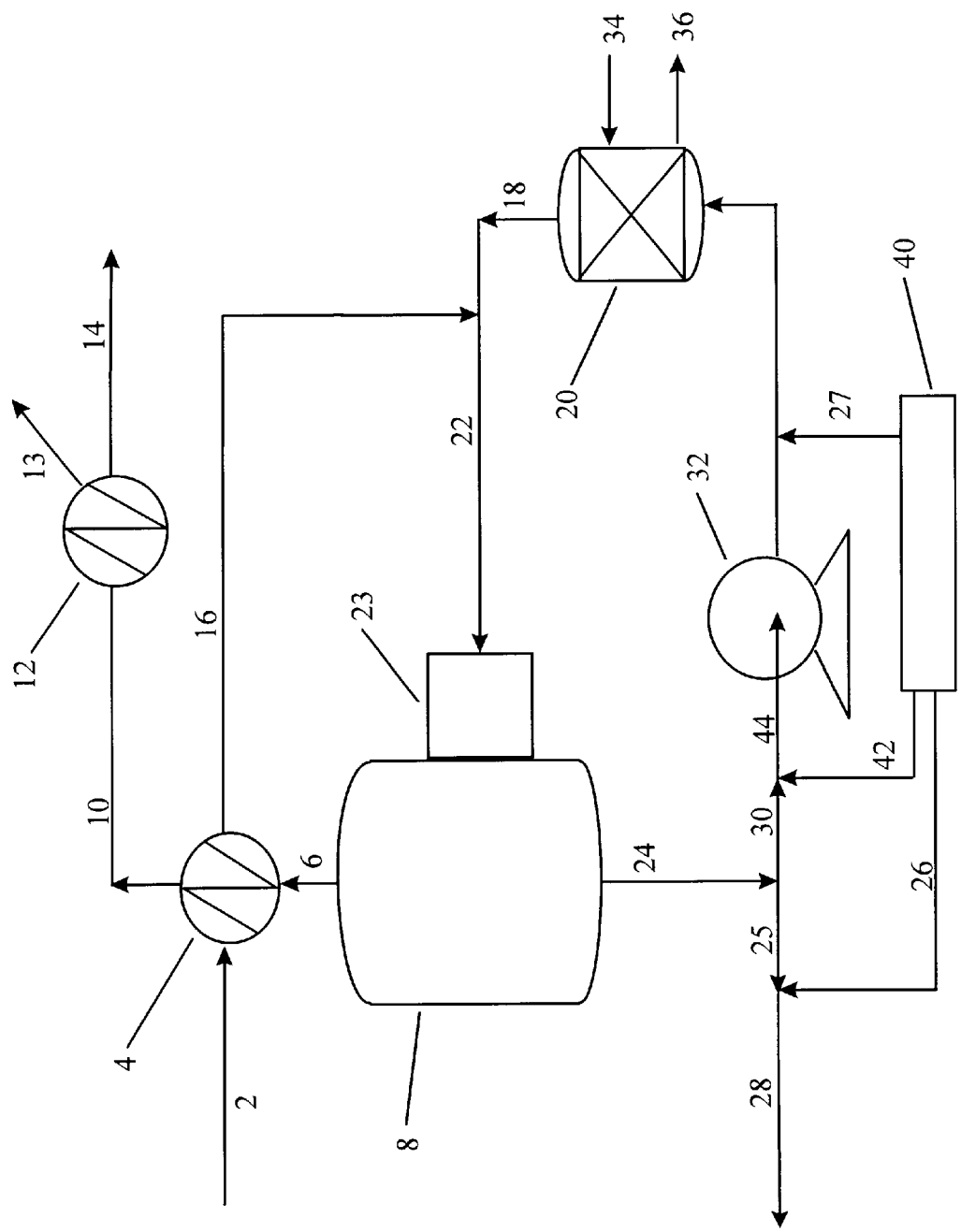
FIG. 1 is a simplified schematic representation of the biosludge concentration treatment.

In accordance with the present invention the heat values contained in biosludge can be used as a simple and effective fuel source in a partial oxidation process for the production of synthesis gas. The biosludge is usually combined with a supplemental hydrocarbonaceous fuel such as coal or oil, and undergoes cogasification in a partial oxidation reaction to generate synthesis gas, also referred to as "syngas".

The partial oxidation gasification reaction is conducted under reaction conditions that are sufficient to convert a desired amount of fuel or feedstock to synthesis gas. Reaction temperatures typically range from about 900° C. to about 2,000° C., preferably from about 1,200° C. to about 1,500° C. Pressures typically range from about 1 to about 250 atmospheres, preferably from about 10 to about 200 atmospheres and most preferably about 20 to 80 atmospheres. The average residence time in the reaction zone generally ranges from about 0.5 to about 20, and preferably from about 1 to about 10 seconds.

The syngas reaction product leaving the partial oxidation reactor generally includes $CO$, $H_2$, steam, $CO_2$, $H_2S$, $COS$, $CH_4$, $NH_3$, $N_2$, volatile metals and inert gases such as argon. The specific product composition will vary depending upon the composition of the feedstock and the reaction conditions. Non-gaseous byproducts include particulate materials, generally carbon and inorganic ash.

The efficiency and economic viability of the biosludge cogasification process requires the solids content of the biosludge be increased to as high a level as possible before being combined with the supplemental hydrocarbonaceous fuel and introduced into the partial oxidation reactor for the production of syngas. It is important to maximize the ratio of the biosludge to the supplemental fuel. Otherwise, the fuel loading can be hindered by the high water content and/or poor slurrying properties of the biosludge. Thus, the efficiency of the gasification of biosludge increases as the water content of the biosludge decreases and the solids content increases. A suitable ratio of biosludge to hydrocarbonaceous fuel on a water-free weight basis is about 1:50 to about 1:1, and preferably about 1:25 to about 1:2, respectively.

The biosludge or biosolids fed to the dewatering process can be at any water content. Thus, the biosludge can be sourced from the material produced by simple settling in a primary treatment facility, or from mechanically dewatered feed, and the like. The initial water content will influence the amount of water removed in relation to the amount of "dry" solids produced and the size of the heat exchangers. It is preferred to use a biosludge feed to the dewatering process containing greater than 3% by weight dry solids.

In one embodiment of the invention, the biosludge feed is preheated by heat exchange with a heat source prior to the evaporation step. Generally there will be large amounts of low grade excess heat available for heat exchange from the syngas cooling train comprising the syngas trim cooler, syngas cooler, flashgas condenser, or quench water coolers. A particularly desirable source of heat for the preheating step is the water vapor exiting the biosludge evaporator.

The biosludge feed material, with or without preheating by heat exchange with the water vapor exiting the biosludge evaporator, is combined with a hot oil stream exiting the reboiler of a biosludge evaporator. The biosludge evaporator is typically a flash evaporator. The relative amount of hot oil to biosludge on an as-fed basis in the combined stream to the biosludge evaporator varies from about 1:1 to about 20:1, and preferably about 5:1 to about 15:1, respectively, by weight.

The temperature and pressure of the contacting step is regulated so that no boiling of water occurs in the combined biosludge/oil stream prior to entry into the biosludge evaporator. It is important that no boiling occur at this point because once boiling commences, the volume expansion is rapid and of great magnitude. For example, one pound of steam has approximately 1,000 times the volume of one pound of water. Thus velocity and pressure drop increase radically unless ample space is provided in the evaporator to separate the vapor from the rest of the biosludge, oil mixture. Cell rupture is enhanced by rapidity of the pressure drop.

The hot oil and biosludge enter the evaporator through a pressure reducing device. In the evaporator, water vapor is released from the intracellular water content of the biosludge. The pressure reducing device is typically a valve located on the exterior inlet to the evaporator. As a result of the contacting of the hot oil with the biosludge and the rapid pressure reduction, the cell structure housing the intracellular water is weakened. The weakened cell walls housing the intracellular water are then ruptured in the evaporator, releasing the intracellular water. Some or all of the intracellular water then vaporizes since the temperature of the biosludge/oil mixture entering the evaporator is above the water saturation temperature at the flash evaporator pressure.

Suitable pressures in the evaporator vary from about 0 about 60 psia, and preferably about 0.5 to about 20 psia. Suitable temperatures of the biosludge/oil mixture prior to the pressure reduction step are about 80° C. to about 350° C., and preferably about 90° C. to about 250° C. As the water evaporates, the overall temperature will drop. This is referred to by those skilled in the art as an "adiabatic flash evaporation." The temperature in the evaporator and fraction of water evaporated will be such that enthalpy of the entering stream will equal the enthalpy of the streams leaving the evaporator except for minor enthalpy or heat losses from walls of the vessel.

Water vapor exits the top of evaporator. The hot oil and concentrated biosludge mixture exit the bottom of the evaporator. A portion of the concentrated biosludge/oil mixture is passed to the gasifier. The remainder is heated in a reboiler to provide the energy to convert the intracellular water released in the evaporation step to vapor. A separate stream of hot oil can be used to heat the concentrated biosludge mixture which passes through the reboiler. Additional oil can be added to the concentrated biosludge mixture when needed, preferably at the heating oil inlet to the reboiler.

The hot oil and concentrated biosludge mixture that is heated in the reboiler is then directly contacted with the biosludge feed material to form a combined stream. The hot oil and concentrated biosludge mixture provide sufficient heat to the combined stream to evaporate intracellular water from the biosludge feed material in the evaporator.

The overhead vapor from the evaporator can be cooled by heat exchange with the incoming biosludge or oil. The overhead vapor can then be further cooled in a separate condenser or in a flash gas condenser. The water condensed from the vapor can be used as a moderator in the partial oxidation gasification reaction. Excess water can be routed to a wastewater treatment plant to remove suspended and dissolved organic substances prior to the discharge of the water in accordance with environmental regulations.

The reboiler can be heated with external steam or fuel or can use some or all of the heat sources available from the partial oxidation gasification system depending on the energy available. The partial oxidation gasification system includes syngas trim coolers, syngas coolers, flashgas condensers, or quench water coolers. The amount and sources of heat used will depend on the desired ratio of biosludge to oil and the water content of the biosludge or sewage used.

Referring now to FIG. 1, biosludge stream 2 enters the heal exchanger 4 where it comes into indirect contact with hot water vapor stream 6 exiting the top of the biosludge evaporator 8. The hot water vapor stream 6 indirectly preheats the biosludge 2 to a temperature of about 35°C. to about 250° C. Cooled water vapor stream 10 which can also be a mixture of liquid and vapor, exits heat exchanger 4 at a temperature of about 25°C. to about 120° C., and enters the condenser 12 where it is divided into water stream 13, which can serve as a moderator for the partial oxidation gasification reaction (not shown), and water stream 14 which can be recycled to a waste water treatment plant (not shown).

Heated biosludge stream 16 exits the heat exchanger 4 at a temperature of about 30° C. to about 240° C., and is contacted directly with the hot oil stream 18 exiting the reboiler 20 at a temperature of about 80° C. to about 350° C. to form combined oil/sludge stream 22 at a temperature of about 105° C. to 250° C. The hot oil stream 18 also contains a portion 30 of concentrated biosludge from line 24 exiting from evaporator 8. The combined oil/sludge stream 22 passes through the pressure reducing device 23 which is typically a valve that causes the pressure of stream 22 to drop as it enters the biosludge evaporator 8. The pressure is typically below the saturation pressure of water at the temperature of stream 22, for example, about 0.01 atmospheres (0.147 psia) to about 2 atmospheres (29.4 psia). The biosludge stream 16 contacts the hot oil stream 18 at a pressure which exceeds the water saturation pressure at the temperature of stream 22. This prevents the evaporation of water until stream 22 passes through the pressure reducing device 23. The pressure can vary from about 0.1 atmospheres (1.47 psia) to about 40 atmospheres (587.8 psia).

The hot oil stream 18 can be any oil with a heating value above about 8,000 BTU/pound. Typical examples of suitable oils include heavy crude oil, fuel oil, atmospheric resid, vacuum resid, visbreaker tar, solvent deasphalting residuum, or a combination of these oils.

The biosludge evaporator 8 operates at conditions which are designed to rupture the bacterial cells containing the intracellular water of the biosludge in stream 22. The chemical nature and temperature of the hot oil, on the order of about 80° C. to about 350° C., acts to weaken or disrupt the cell walls of the biosludge housing the intracellular water.

The reduction of pressure from above the water saturation pressure at the point of mixing of streams 18 and 16 to below the water saturation pressure in the evaporator 8 causes a portion of the intracellular water to vaporize, resulting in the rupturing of most of the bacterial cell walls of the biosludge previously weakened due to the effect of the hot oil on the cell membranes. The intracellular water is released as vapor in stream 6 which exits from the top of evaporator 8.

The hot oil and concentrated biosludge stream 24 which remains after the release of the intracellular water exits the evaporator 8 at a temperature of about 105° C. to about 250° C.

The concentrated biosludge/oil stream 24 exiting the bottom of the biosludge evaporator 8 is divided into oil/sludge streams 25 and 30. Supplemental oil feed 26 from reservoir 40 can be combined as needed with the oil/sludge stream 25 to form cogasification stream 28 which is introduced into a partial oxidation gasification system (not shown) and used as fuel for a partial oxidation reaction for the production of synthesis gas.

Ultimately, oil has to be added to the process to make up for losses of oil in stream 25. This oil can be added in stream 42 upstream of the pump 32 or in stream 27 downstream of the pump 32, with the choice being dictated by design preferences and the temperature and the pressure of available oil.

The additional oil feed stream 42 from oil feed reservoir 40 can be combined with oil/sludge stream 30 to form combined stream 44 which is passed through the pump 32 and enters the reboiler 20. If the oil in reservoir 40 is available at sufficiently high pressure it can be added downstream of pump 32 in stream 27 instead of upstream in stream 42.

The ratio of the biosludge dry solids contained in stream 24 to the oil in streams 27 and 42 varies from about 0.01:1 to about 1:1, and preferably from about 0.1:1 to about 0.99:1.

The reboiler 20 can be heated with steam, flashgas, or hot water, or hot syngas introduced as stream 34 to provide the heat source for the reboiler 20, which exits as condensate, water, or cooled syngas stream 36.

The sources of heat used will depend on the ratio of biosludge to oil desired and the water content of the biosludge used.

The ratio of oil/sludge stream 25 to concentrated oil/sludge feed 30 can range from about 1:1 to about 1:100, and preferably about 1:2 to about 1:50 respectively.

All parts and percentages indicated throughout the application are by weight, unless otherwise indicated.

Example 300 lbs of biosludge containing 4 weight % dry solids is treated in the operating system of FIG. 1. After being preheated, the biosludge is combined with 3100 lbs of a mixture comprising 2743.4 lbs oil, 329.2 lbs dry solids and 27.4 lbs water. The heated combined biosludge/oil mixture then undergoes pressure reduction and evaporation at 1.4 atmospheres (20.58 psia) which results in the rupture of the bacterial cell walls of the biosludge thereby releasing 287 lbs of intracellular water in the form of a not aqueous vapor and producing 3113 lbs of a concentrated biosludge/oil mixture which exits the evaporator. The concentrated biosludge/oil mixture is divided into a first stream of 113 lbs of biosludge/oil to provide a cogasification fuel stream for a partial oxidation reaction.

The remaining 3000 lbs of the concentrated biosludge/oil mixture are combined with 100 lbs of oil and pumped to the reboiler where the combination is heated to 350° C. and combined with incoming biosludge.

What is claimed is:

1. A method for concentrating a biosludge for use as a fuel source for a partial oxidation gasification reaction, wherein said biosludge comprises a plurality of bacterial cells with cell walls containing intracellular water, comprising:

(a) dewatering the biosludge to a dry solids content of at least about 3 weight %;

(b) heating the dewatered biosludge in a biosludge evaporator at a temperature sufficient to weaken the cell walls containing the intracellular water and at a rapidly reduced pressure sufficient to rupture the weakened cell walls and release the intracellular water; and (c) evaporating the released intracellular water as a hot aqueous vapor from the ruptured cells of the biosludge, to produce the concentrated biosludge fuel source for the partial oxidation gasification reaction.

2. The method of claim 1, wherein the dewatered biosludge is heated by being directly contacted with a hot oil to form a hot oil/biosludge mixture.

3. The method of claim 1, wherein the heating temperature used to weaken the cell walls of the dewatered biosludge varies from about 80° C. to about 350° C.

4.. The method of claim 1, wherein the rupture pressure varies from about 0 psia to about 60 psia.

5. The method of claim 1 wherein the temperature for evaporating the released intracellular water varies from about 105° C. to about 250° C.

6. The method of claim 1, wherein the hot aqueous vapor is condensed and used as a moderator in a partial oxidation gasification reaction.

7. The method of claim 2, wherein the hot oil/biosludge mixture is subjected to sufficient temperature and pressure to weaken, rupture, and release the intracellular water from the biosludge, thereby producing a hot concentrated biosludge/oil mixture.

8. The method of claim 2, wherein the dewatered biosludge is preheated by indirect contact with the hot aqueous vapor released from the ruptured cells of the biosludge before being contacted with the hot oil.

9. The method of claim 7, wherein the ratio of hot oil to biosludge varies from about 1:1 to about 15:1 respectively.

10. The method of claim 7, wherein the concentrated biosludge/oil is combined with a sufficient amount of a hydrocarbonaceous material to form a fuel for a partial oxidation gasification reaction.

11. The method of claim 10, wherein the ratio of concentrated oil/biosludge to the hydrocarbonaceous fuel varies from about 1.50 to about 1:1.

12. The method of claim 10, wherein the hydrocarbonaceous material is an oil having a heating value of at least about 8,000 BTU/pound.

* * * * *

UNITED STATES PATENT AND TRADEMARK OFFICE
CERTIFICATE OF CORRECTION

PATENT NO : 6,063,147
DATED : May 16, 2000
INVENTOR(S): John D. WINTER, et al.

It is certified that error appears in the above-identified patent and that said Letters Patent are hereby corrected as shown below:

In column 1, line 61, change "by" to --A-- .

In column 2, line 8, change "round" to --found-- .

In column 3, line 23, change "A," to --A-- .

In column 3, line 44, change "biosludge, oil" to --biosludge/oil-- .

In column 3, line 61, change "about" to --to about-- .

In column 6, line 7, change "not" to --hot-- .

Signed and Sealed this

Tenth Day of April, 2001

Attest:

NICHOLAS P. GODICI

Attesting Officer

Acting Director of the United States Patent and Trademark Office